(12) United States Patent
Chen et al.

(10) Patent No.: US 7,489,301 B2
(45) Date of Patent: Feb. 10, 2009

(54) SPLIT KEYBOARD

(75) Inventors: Chao Chen, Waterloo (CA); John Holmes, Waterloo (CA)

(73) Assignee: Research In Motion Limited, Waterloo (CA)

( * ) Notice: Subject to any disclaimer, the term of this patent is extended or adjusted under 35 U.S.C. 154(b) by 690 days.

(21) Appl. No.: 10/825,500

(22) Filed: Apr. 15, 2004

(65) Prior Publication Data

US 2005/0235021 A1 Oct. 20, 2005

(51) Int. Cl.
*G09G 5/00* (2006.01)
(52) U.S. Cl. .................. 345/168; 341/22; 400/485; 400/486
(58) Field of Classification Search .............. 345/168; 341/22; 400/485, 486; 455/550, 554, 575, 455/566
See application file for complete search history.

(56) References Cited

U.S. PATENT DOCUMENTS

| | | | | |
|---|---|---|---|---|
| 5,119,078 | A | * | 6/1992 | Grant ........................ 400/488 |
| 5,336,001 | A | | 8/1994 | Lichtenberg |
| 5,410,333 | A | | 4/1995 | Conway |
| 5,426,449 | A | | 6/1995 | Danziger |
| 5,543,787 | A | | 8/1996 | Karidis et al. |
| 5,575,576 | A | | 11/1996 | Roysden, Jr. |
| 5,626,428 | A | * | 5/1997 | Miwa ........................ 400/486 |
| 5,659,307 | A | * | 8/1997 | Karidis et al. ............... 345/168 |
| 5,661,605 | A | | 8/1997 | Conway |
| 6,005,496 | A | | 12/1999 | Hargreaves et al. |
| 6,304,431 | B1 | | 10/2001 | Kim |
| 6,542,091 | B1 | * | 4/2003 | Rasanen ..................... 341/22 |
| 6,628,961 | B1 | * | 9/2003 | Ho et al. ................... 455/554.1 |
| 6,630,924 | B1 | | 10/2003 | Peck |
| 6,933,926 | B2 | * | 8/2005 | Ukita et al. ................. 345/168 |
| 2001/0021332 | A1 | | 9/2001 | Boldy et al. |
| 2002/0126440 | A1 | | 9/2002 | Webb et al. |
| 2002/0190957 | A1 | * | 12/2002 | Lee et al. ................... 345/169 |
| 2003/0020692 | A1 | | 1/2003 | Griffin et al. |
| 2003/0073414 | A1 | * | 4/2003 | P. Capps .................... 455/550 |
| 2003/0078069 | A1 | * | 4/2003 | Lindeman ................... 455/550 |
| 2003/0095107 | A1 | | 5/2003 | Griffin et al. |

(Continued)

FOREIGN PATENT DOCUMENTS

EP 0 538 020 A1 4/1993

(Continued)

OTHER PUBLICATIONS

EP Communication in Application No. 04 009 033.4-1527, dated Oct. 12, 2004.

(Continued)

*Primary Examiner*—Kevin M Nguyen
(74) *Attorney, Agent, or Firm*—Jones Day; Krishna K. Pathiyal; Robert C. Liang

(57) ABSTRACT

A keyboard includes a plurality of keys associated with alphanumeric characters including the letters A-Z and at least the numbers 1-9. The keys are split into a left side section and a right side section. The left side section is oriented at least partially above the right side section, or the right side section is oriented at least partially above the left side section. A mobile communication device includes the keyboard. A method for inputting alphanumeric characters into a mobile communication device is also provided.

20 Claims, 9 Drawing Sheets

U.S. PATENT DOCUMENTS

2003/0193478 A1* 10/2003 Ng et al. .................... 345/168
2004/0208681 A1* 10/2004 Dechene .................... 400/472
2005/0091431 A1* 4/2005 Olodort et al. ............... 710/72

FOREIGN PATENT DOCUMENTS

EP            0 712 144 A2   5/1996
WO          WO 03/056784 A2   7/2003

OTHER PUBLICATIONS

EP Communication in Application No. 04 009 033.4-1527, dated May 5, 2006.
Response to EP Communications pursuant to Art. 96(2) EPC in Application No. 04 009 033.4-1527, dated Nov. 13, 2006.
European Search report for corresponding application EP 04 00 9033, dated Sep. 28, 2004.

* cited by examiner

SPLIT KEYBOARD

FIELD

This technology relates to a split keyboard for an electronic device. In particular, the technology concerns a split keyboard for a handheld mobile communication device, such as a mobile phone.

BACKGROUND

Different standard keyboard arrangements are known. The most widely used English-language alphabetic key arrangement is the QWERTY arrangement. Other types of standard English-language alphabetic key arrangements include the QWERTZ arrangement, the AZERTY arrangement, and the DVORAK arrangement. Each of these arrangements, when presented as a full-size keyboard, utilizes 26 keys for 26 different characters.

Numeric characters are often presented along with alphabetic characters on keyboards of communication devices, such as telephones. One standard setting body, the International Telecommunications Union ("ITU"), has established phone standards for the arrangement of alphanumeric keys. One such standard, shown in FIG. 1, corresponds to ITU Standard E.161, entitled "Arrangement of Digits, Letters, and Symbols on Telephones and Other Devices That Can Be Used for Gaining Access to a Telephone Network" (also known as ANSI TI.703-1995/1999 and ISO/IEC 9995-8:1994). According to this standard, ten keys are used to present the alphabetic characters A-Z and the numbers 0-9. In order to enter alphabetic characters, the user may be required to multi-tap the keys until the desired character appears on a display screen, among other known entry techniques.

Mobile communication devices that include a combined text-entry keyboard and a telephony keyboard are known. Examples of such mobile communication devices include mobile stations, cellular telephones, wireless personal digital assistants (PDAs), two-way paging devices, and others. Combining a traditional-style text-entry keyboard (e.g., a QWERTY-style keyboard) with a traditional-style telephony keyboard on the same mobile communication device typically involves undesirable ergonomic and/or intuitive user interface compromises. The size of the keyboard is often limited by the size of the device, making the keyboard more difficult to use.

One prior art device that incorporates a combined alphabetic/numeric keyboard is the RIM Blackberry 950 mobile communication device, shown in FIG. 2. In this device, numeric characters share keys with alphabetic characters on the top row of the QWERTY keyboard. Another prior art device that incorporates a combined alphabetic/numeric keyboard is the RIM Blackberry 6210 mobile communication device, shown in FIG. 3. This device utilizes numeric characters in a numeric phone key arrangement consistent with the ITU Standard E.161, discussed above. The numeric characters share keys with alphabetic characters on the left side of the keyboard. Both of these devices are designed for entry of characters using the thumbs.

SUMMARY

In accordance with the teachings described herein, a keyboard comprises a plurality of keys associated with alphanumeric characters including the letters A-Z and at least the numbers 1-9. The keys are split into a left side section and a right side section. The left side section is oriented at least partially above the right side section to define an upper section corresponding to the left side section and a lower section corresponding to the right side section. Alternatively, the right side section is oriented at least partially above the left side section to define an upper section corresponding to the right side section and a lower section corresponding to the left side section.

All of the keys of the upper section may be positioned above all of the keys of the lower section. Part of the upper section may vertically overlap part of the lower section. Part of the upper section may transversely overlap part of the lower section.

The alphanumeric characters may represent a QWERTY-style key arrangement. The upper section may include keys associated with alphabetic characters "QWERTASDFG-ZXCV" and the lower section may include keys associated with alphabetic characters "YUIOPHJKLBNM".

The upper section may comprise at least three rows and five columns of keys and the lower section may comprise at least three rows and five columns of keys. The five columns of the upper section may align longitudinally with the five columns of the lower section. Alternatively, the five columns of the upper section may be offset from the five columns of the lower section.

The left side section of the keys may comprise a first row associated with the characters "Q", "W", "E", "R", and "T", a second row may be associated with characters "A", "S", "D", "F", and "G", and a third row may be associated with characters "Z", "X", "C", and "V". The right side section of keys may comprise a first row associated with the characters "Y", "U", "I", "O", and "P", a second row associated with characters "H", "J", "K", and "L", and a third row associated with characters "B", "N", and "M".

The left side section of keys may be associated with numbers "1-9", with the "1", "2", and "3" being associated with the first row, the "4", "5", and "6" being associated with the second row, and the "7", "8", and "9" being associated with the third row. A key associated with a space function and key associated with the number "0" may also be provided. In one embodiment, the space function and the number "0" are associated with the same key.

The right side section of keys may be associated with numbers "1-9", with the "1", "2", and "3" being associated with the first row, the "4", "5", and "6" being associated with the second row, and the "7", "8", and "9" being associated with the third row. The keyboard may also include a key associated with the space function and a key associated with the number "0". The number "0" may be associated with a key in one of the left side section or the right side section.

At least some of the plurality of keys may be further associated with symbols or functions. The keyboard may also include a thumb wheel coupled to the keyboard. In addition, a key associated with a "send" function, a key associated with an "end" function, and at least one key associated with a "shift" function may be provided. The keyboard may also include a key associated with the caps function. More than one caps function key can be provided, with a caps key being associated with the upper section and a caps key being associated with the lower section.

In another embodiment, a mobile communication device comprises a housing having a face and the keyboard, described above, associated with the face.

In yet another embodiment, a mobile communication device comprises a housing having a face and a keyboard associated with the face of the housing. The keyboard includes a plurality of keys associated with both alphabetic and numeric characters arranged in a standard alphabetic format selected from a group consisting of QWERTY, QWERTZ, AZERTY, and DVORAK. The keyboard is split into a left side section and a right side section, with one of the left or right side sections being disposed at least partially above the other section on the face of the housing.

In a further embodiment, a method for inputting alphanumeric characters into a mobile communication device comprises holding a mobile communication device having the keyboard, described above, with two hands such that the thumbs of the hands align with keys on the keyboard, utilizing a thumb of one hand to enter key strokes on the left side section of the keyboard, and utilizing a thumb of the other hand to enter keystrokes on the right side section of the keyboard. One of the thumbs is positioned above the other thumb on the face of the housing.

BRIEF DESCRIPTION OF THE DRAWING FIGURES

DETAILED DESCRIPTION

Figures 1, 2:
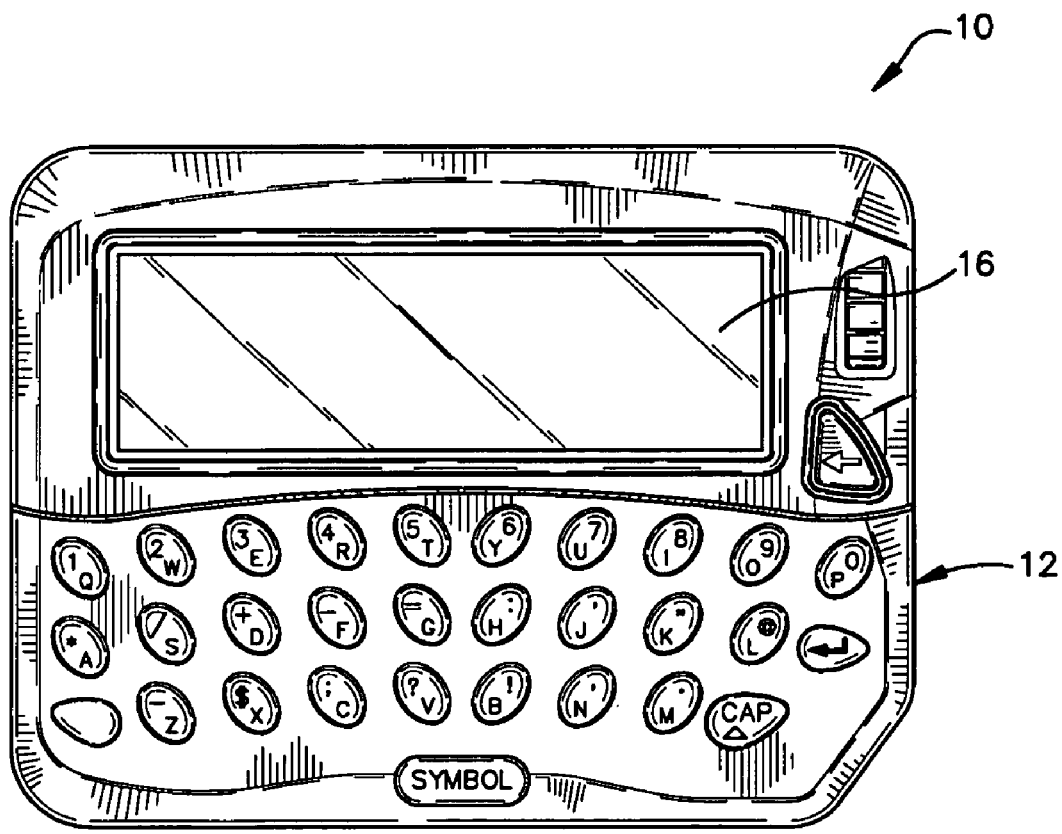
FIG. 1 is a plan view of a standard numeric phone/alphabetic keypad arrangement according to ITU standard E.161.
FIG. 2 is an elevated view of a prior art handheld mobile communication device.

With reference now to the drawings, the example keyboard 14 is depicted in FIGS. 4-9 as a split alphanumeric keyboard or keypad that includes a full alphabetic array of letters A-Z (hereinafter referred to as "full keyboard" or "full size") and the numbers 0-9. In a preferred embodiment, a total of 26 alphabetic keys are provided, with additional keys being utilized for additional numbers, symbols, and or functions. In all of the embodiments, at least some numbers share keys with letters. The term keyboard or keypad is used interchangeably herein to refer to a set of keys used for inputting data into a device. It is preferred that at least some of the keys be multi-functional, meaning that the keys can be used to input more than one of the following: letters, numbers, symbols, and functions. In a preferred embodiment, the majority of keys are multi-functional.

The keys on the keyboard 14 are preferably used for both text entry and telephony entry. The numeric keys are preferably used in a telephony mode and the alphabetic keys are preferably used in a text entry mode. Symbols and functions may be used in either or both the telephony and text entry modes. In order to switch between text entry and telephony modes, a mode selection switch may be utilized, such as a toggle key. Sample toggle keys include the "alt" or "shift" key, where the user selects one of these keys to switch data input from text-entry to telephony mode, or vice versa.

Alternatively, software may be used to determine the mode of entry. If the user is utilizing the telephony application, the default data entry mode will be numbers. If the user is utilizing the text-entry application, such as when composing an email, the default data entry mode will be text. When in each of these modes, the user may switch modes manually by utilizing a toggle key. For example, to enter text in a telephony application, the user selects the "shift" key 20 and then presses the desired alphanumeric key corresponding to the desired letter. Software could also be used to predict whether the user is in telephony or text-entry mode, based upon the keystrokes that are entered by the user, the example keyboard 14 not being limited by the mode selection function.

The various split alphanumeric keyboard arrangements described herein are directed to the field of small, hand-held electronic mobile communication devices 10, such as mobile stations, cellular telephones, wireless personal digital assistants (PDAs), personal information managers (PIMs), two-way paging devices, and others. For simplicity, the drawings depict a cellular telephone in the form of a flip-type phone 22 in FIGS. 4-6 and a "candy bar"-type phone 24 in FIGS. 7-9. Any type of mobile communication device may be utilized with the example keyboards 14.

In order to keep the form factor of the mobile communication device 10 small enough to be worn on the body of a user, the keyboard 14 must be small. The example keyboards 14 are designed for optimized usage with the thumbs. This is accomplished first by providing a keyboard 14 having keys that are oriented as they appear on a standard keyboard such that the keyboard layout is familiar to the user. The example keyboard 14 splits the standard keyboard into a left and right half, with either the left half 26 or the right half 28 being positioned above the other half on the face 30 of the communication device 10. This enables a user to utilize his or her thumbs to select keys, but with one thumb positioned above the other thumb during key selection, rather than side by side, as with known devices that utilize a standard full keyboard. The provision of a split keyboard allows for a full size keyboard that takes up less width on the face 30 of the communication device 10, allowing for placement of a full-sized keyboard on a cellular telephone, for example. As is readily apparent from the drawings, the example keyboard 14 allows for the use of a full-size alphanumeric keyboard on a standard size cellular phone.

The mobile communication devices 10, shown in FIGS. 4-9, include a housing 12, a display 16, a keyboard 14, a microphone 32, and a speaker 34. The housing 12 is configured to be held with one or two hands while the device is in use. The device 10 is preferably small enough to fit inside a standard purse or suit jacket pocket. The microphone and the speaker (shown in phantom) are positioned inside the housing 12, with respective apertures 36 disposed through the housing 12 associated with each device. Other internal components of the device 10 may also be mounted in the housing 12. For example, a digital camera 38 may be provided, as well as additional auxiliary I/O devices (not shown), as known by those of skill in the art.

Figure 4:
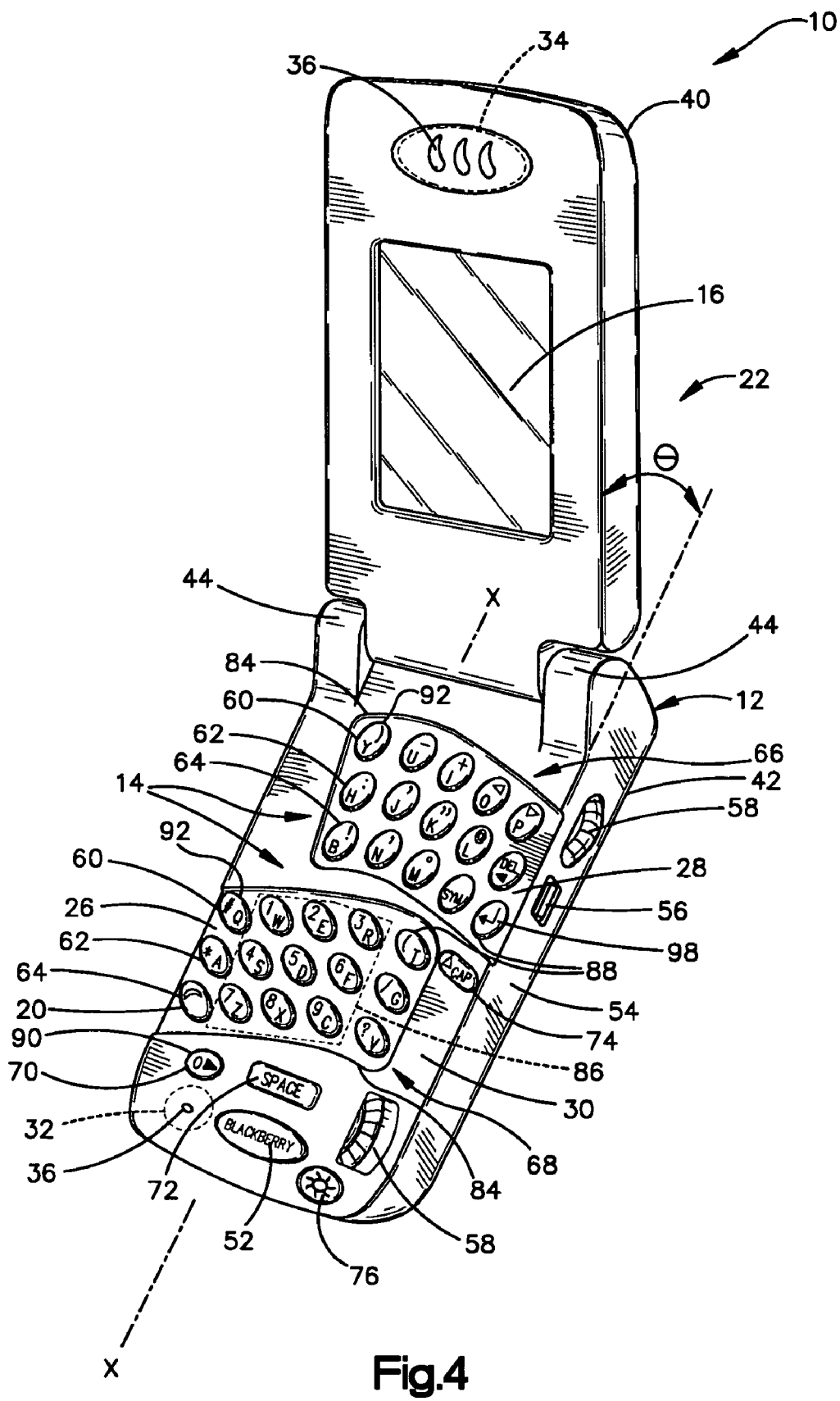
FIG. 4 is a perspective view of a handheld mobile communication device having an example split keyboard.
Figure 5:
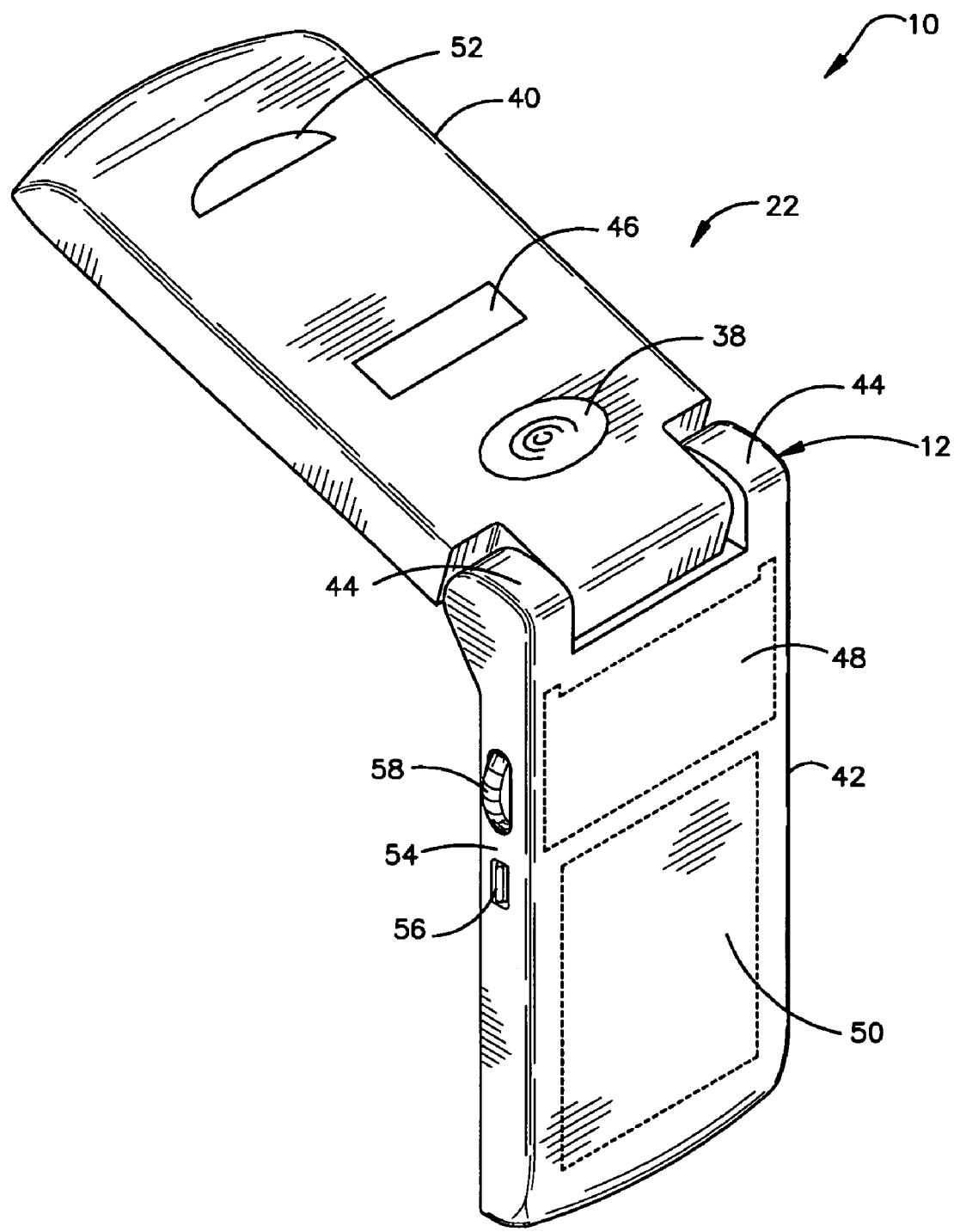
FIG. 5 is a perspective rear view of the handheld mobile communication device of FIG. 4.
Figure 6:
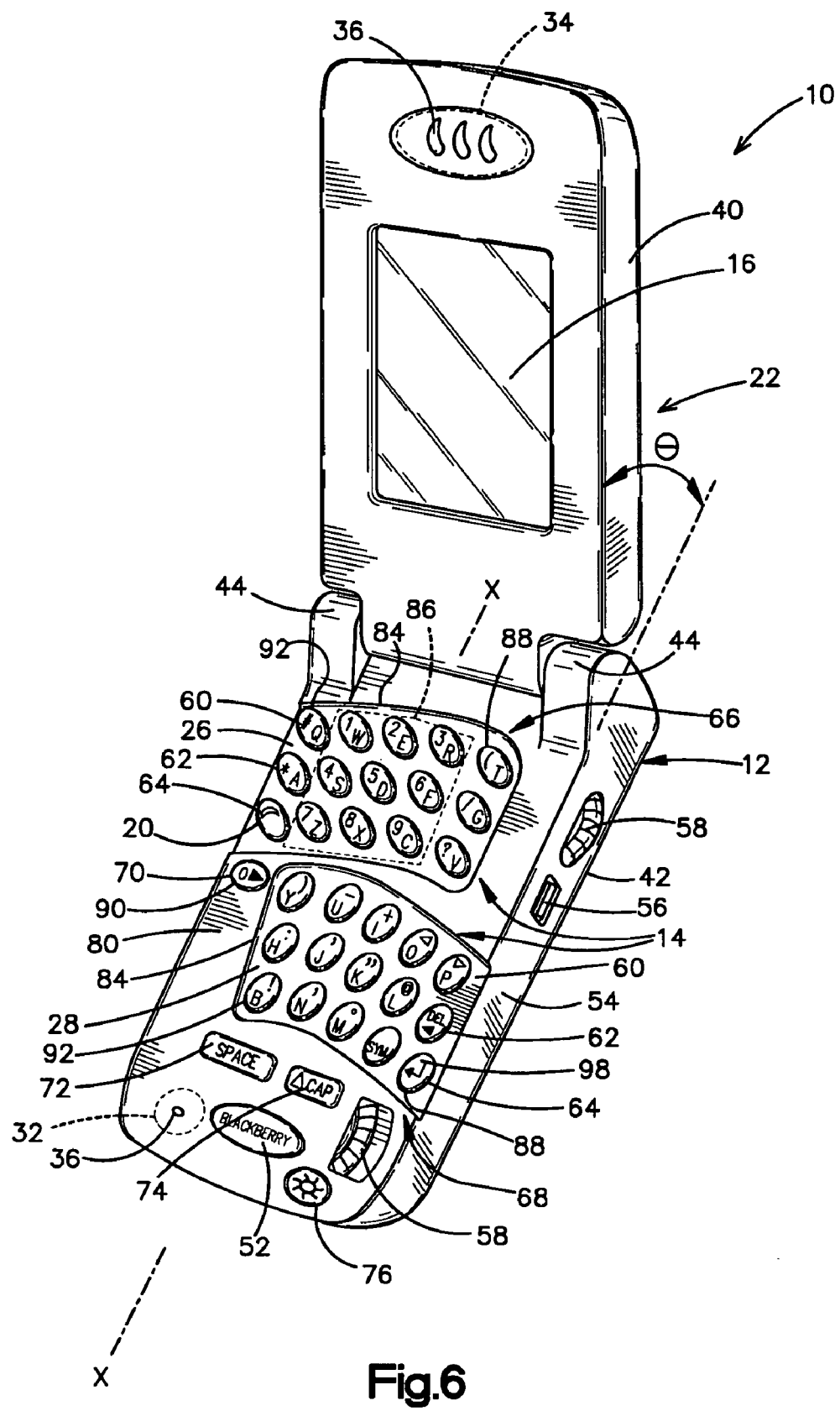
FIG. 6 is a perspective view of an a handheld mobile communication device having an alternative example split keyboard.

As shown in FIGS. 4-6, a cellular telephone in the form of a flip-style phone 22 includes an upper housing section 40 and a lower housing section 42. The upper housing section 40 and lower housing section 42 are connected by a hinge 44, such as the double hinge depicted in the figures. The phone shown in the Figures is in an open position, where the upper housing section 40 is positioned at an angle Θ of approximately 150° to 180°. In a closed position, which is not shown, the upper housing section 40 folds down upon the lower housing section 42 around the hinges 44 such that the upper housing section 40 seats upon the lower housing section 42, as known by those of skill in the art.

The display 16 is positioned in the upper housing section 40 and the keyboard 14 is positioned in the lower housing section 42. A portrait LCD is depicted. As shown in FIG. 5, the phone also includes a secondary LCD 46 on an exterior surface of the upper housing section 40, as known by those of skill in the art. A digital camera 38 is also associated with the upper housing section 40 of the phone 22. The lower housing section 42 also houses an antenna 48 and a battery 50. The battery 50 and antenna 48 may be disposed inside the housing section 40 and may include access doors (not shown), if desired. Advertising indicia 52, such as a logo, may be positioned at various points on the housing 12, if desired.

As shown in FIGS. 4 and 6, the full size keyboard is preferably positioned on an upper face 30 of the lower housing section 42. Additional keys are also associated with the upper face 30. Other keys are positioned on the side wall 54 of the lower housing section 42. As shown in FIGS. 4 and 6, an escape key 56 and a thumb wheel 58 are positioned on the side wall 54. Alternatively, the thumb wheel 58 and escape key 56 may be positioned on the upper face 30 of the lower section 42, at other points on the lower or upper housing sections 42,40, or not present, if desired. The thumb wheel 58 is depicted on both the upper face 30 of the lower housing section 42 and on the side wall 54 of the lower housing section 42. In a preferred embodiment, only one thumb wheel 58 is present on the device 10, although more than one may be present if desired. Two thumb wheels 58 are depicted in order to signify the different possible locations for a thumb wheel 58.

In each of the embodiments shown in FIGS. 4, and 6-9, the full size keyboard is split into a left side section 26 and a right side section 28. Both the left and right side sections 26, 28 include at least three rows and at least five columns. The left side 26 section includes keys associated with alphabetic characters "Q", "W", "E", "R", and "T" in a first row 60, keys associated with alphabetic characters "A", "S", "D", "F", and "G" in a second row 62, and keys associated with alphabetic characters "Z", "X", "C", and "V" in a third row 64. Since keys in the third row 64 are associated with fewer than five alphabetic characters, keys that are not associated with alphabetic characters may alternatively be associated with numbers, symbols, or functions. The right side section 28 includes keys associated with alphabetic characters "Y", "U", "I", "O", and "P" in a first row 60, keys associated with alphabetic characters "H", "J", "K", and "L" in a second row 62, and keys associated with alphabetic characters "B", "N", and "M" in a third row 64. Since keys in the second 62 and third 64 rows of the right side section 28 are associated with fewer than five alphabetic characters, keys that are not associated with alphabetic characters may alternatively be associated with numbers, symbols, or functions. Alternatively, in both the left and right side sections 26,28, there may be provided only 26 keys, with the non-alphabetic keys (e.g., those not associated with alphabetic characters), being absent altogether.

One of the left side or the right side sections 26,28 is positioned above the other section as an upper section 66 and a lower section 68. In one embodiment, the left side section 26 is oriented at least partially above the right side section 28 to define an upper section 66 corresponding to the left side section 26 and the lower section 68 corresponding to the right side section 28. In another embodiment, the right side section 28 is oriented at least partially above the left side section 26 to define the upper section 66 corresponding to the right side section 28 and the lower section 68 corresponding to the left side section 26.

Either of the left or right side sections 26, 28 may be associated with each of the numbers "0-9", or fewer than the numbers 0-9. For instance, some of the numbers could be associated with the upper section 66, some of the numbers could be associated with the lower section 68, and some of the numbers could be associated with other keys, that are not part of the upper and lower sections 66, 68. It is preferred that at least the numbers "1-9" 86 are associated with one of the upper or lower sections 66, 68 so that the numbers may be aligned in a traditional telephony grid, with the key associated with the number "0" 70 being positioned in the direct vicinity of the remainder of the numbers "1-9" for ease of use. For instance the numbers "1-9" 86 could be associated with keys in the upper section 66 and the number "0" 70 could be associated with keys in the lower section 68. Alternatively, the "0-9" could be associated with keys in only the upper section 66 or only the lower section 68. A variety of options for numeric placements are available, as will be readily evident to one of skill in the art.

Additional keys, above and beyond those present in the upper and lower sections 66, 68 may also be positioned on the face 30 of the housing 12. For instance, a space bar 72; caps lock/caps 74; power key 76; back light key 76; send key 78; end key 80; escape key 56; arrow keys 82; thumb wheel 58; or other keys may also be utilized, as desired. The thumb wheel 58 is an additional input means for control of functions that might otherwise be controlled by a keyboard that included function keys. The thumb 58 wheel is preferred to encourage data entry using thumbs and to minimize the number of keys on the keyboard 14. It can be used to control menus (not shown) on the display 16 and to input functions relevant to data input. The thumb wheel 58 is preferably positioned in close proximity to the keyboard 14 to enable the easy transition from thumb typing to thumb control of forms and functions via the thumb wheel 58.

FIG. 4 depicts a split keyboard 14 where the left side section 26 is the lower section 68 and the right side section 28 is the upper section 66. Each of the rows 60, 62, 64 are arcuate and the keys are oval shaped and slanted. The left side 26 keys are slanted to the left and the right side 28 keys are slanted to the right. The upper section 66 is positioned entirely above the lower section 68, and the upper and lower sections 66, 68 are delineated by a surface treatment 84 on the face 30 of the lower housing section 42, such as by being encircled at least in part by a line or other markings 84 on the surface. The upper section 66 is offset about one column width to the right relative to the lower section 68, so that the lower section 68 is positioned slightly to the left of the upper section 66. This allows for greater ease in inputting keystrokes by the user, whose left and right hands can be offset slightly from one another. Alternative embodiments, discussed below in connection with FIG. 8, have the upper and lower sections 66, 68 positioned in a non-offset manner, such that the upper and lower sections 66, 68 are symmetric about a longitudinal axis X-X of the housing 12.

In addition to the alphabetic keys discussed above, the left side section 26 also includes the numbers "1-9" 86 and a shift function 20, as well as various symbol keys, including a "#", "(", "*", "/", and "?". The shift function 20 is used to select between the letters, number, symbols, or functions associated with each key. For example, the shift key 20 may be selected to select between text entry mode (the characters associated with the lower half of the keys) and telephony mode (the characters associated with the upper half of the keys). Other symbols or functions may alternatively be utilized. The right side section 28 includes various symbols and functions, such as ")", "−", "+", left shift, right shift, ":", "'"", """", "@", backspace/delete, "!", ";", ".", symbol, and return/enter. The return/enter function 98 is associated with the fifth column 88 and third row 64 of the upper section 66, in a location that may be more familiar to a user. Additional keys are also associated with the face 30 of the device 10, including a space key 72, a caps lock/caps key 74, a power/backlight key 76, and a key associated with the number "0"/caps key 70, 90. The shift key 20 shifts between upper/lower characters on each key while the caps key 74, 90, which is used in text entry mode, selects capital or lower case letters.

A thumb wheel 58 may be associated with the face 30 of the device 22, be associated with a side wall 54 of the device, or both. In addition, an escape key 56 is shown positioned on the side wall 54 of the device 22 below the thumb wheel 58. As is evident a caps function 74, 90 is associated with both the upper section 66 and the lower section 68, such that the caps function 74, 90 may be selected by the user with either thumb during keystroke entries. In addition, the space function 72 is positioned directly below the lower section 68 in a position that is intended to be more familiar to a user, such as with a traditional full keyboard where the space function is associated with a key that is in the bottom, center of the keyboard 14.

FIG. 6 depicts an embodiment similar to that of FIG. 4, but with the left side section 26 being the upper section 66 and the right side section 28 being the lower section 68. The upper section 66 is offset horizontally from the lower section 68 by about one column width. The rows 60, 62, 64 are arcuate and the keys are oval shaped. The left side keys 26 are slanted to the left while the right side keys 28 are slanted to the right. The left side keys 26 include the numbers "1-9" 86, as well as symbols "#", "(", "*", "/", "?", and the shift function 20. The shift function 20 is positioned in the first column 92, third row 64 of the upper section 66, in a position that may be familiar to a user of a traditional full keyboard. The shift function 20 is used to select between text entry and telephony mode, as discussed in connection with FIG. 4. The right side section 28 includes symbols and functions ")", "−", "+" left shift, right shift, ":", "'"", """", "@", backspace/delete, "!", ";", ".", sym, and return/enter. The return/enter key is positioned in the third row 64, fifth column 88 of the right side section 28, in a position that may be familiar to a user of a traditional full keyboard.

Additional keys are also positioned on the face 30 of the device housing 42 shown in FIG. 6. The number "0" 70 is positioned directly beneath the upper section 66 and positioned adjacent the lower section 68, in the vicinity of the remainder of the number keys. A caps function 90 is also associated with the "0" key 70 for use in selecting lower and upper case letters. In addition, a space key 72 is positioned below the lower section 68 in a centered position, and an additional caps/caps lock key 74 is positioned adjacent the space key 72 and below the lower section 26. A caps key 90 is associated with both the upper and lower sections 66, 68 in order to allow ease in selecting capital or lower case letters. In addition, a power/backlight key 76 and thumb wheel 58 are positioned below the lower section 66. Alternatively, a thumb wheel 58 may be positioned on the side wall 54 of the device 22, along with an escape key 56. The escape key 56 may also be positioned on the face 30 of the housing 42.

Figure 7:
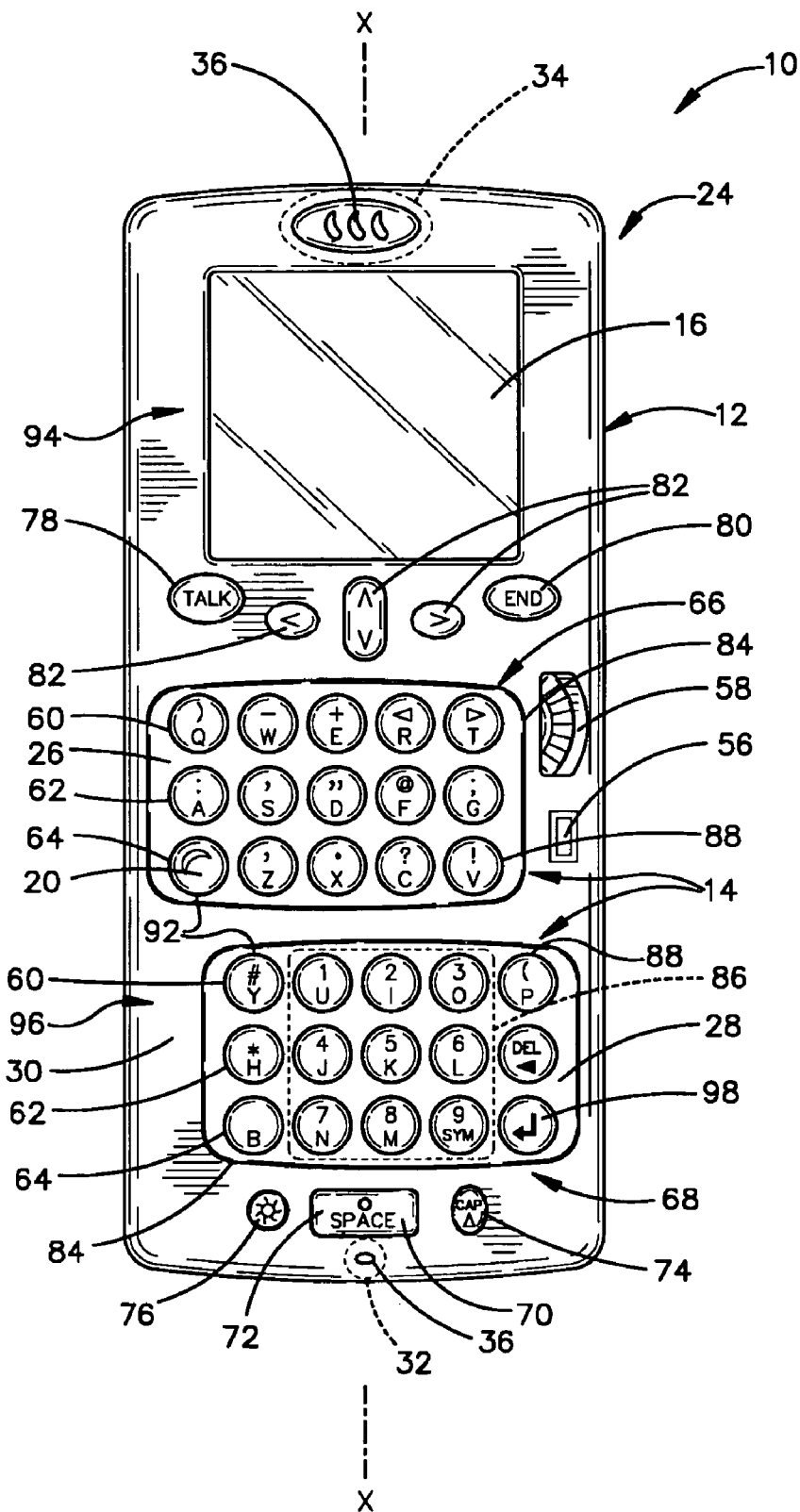
FIG. 7 is an elevated front view of a handheld mobile communication device having yet another example split keyboard.
Figure 8:
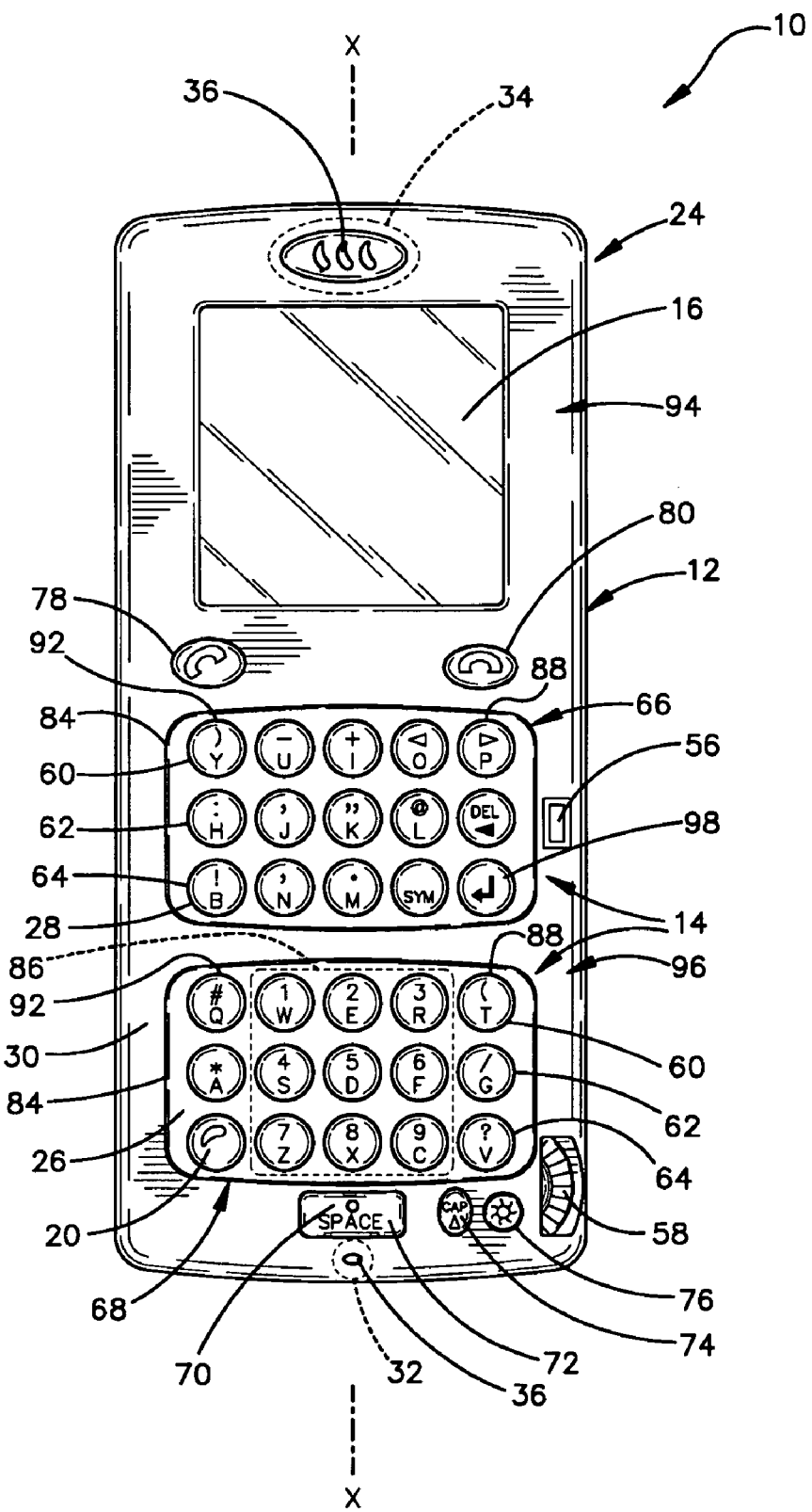
FIG. 8 is an elevated front view of a handheld mobile communication device having a further example split keyboard.
Figure 9:
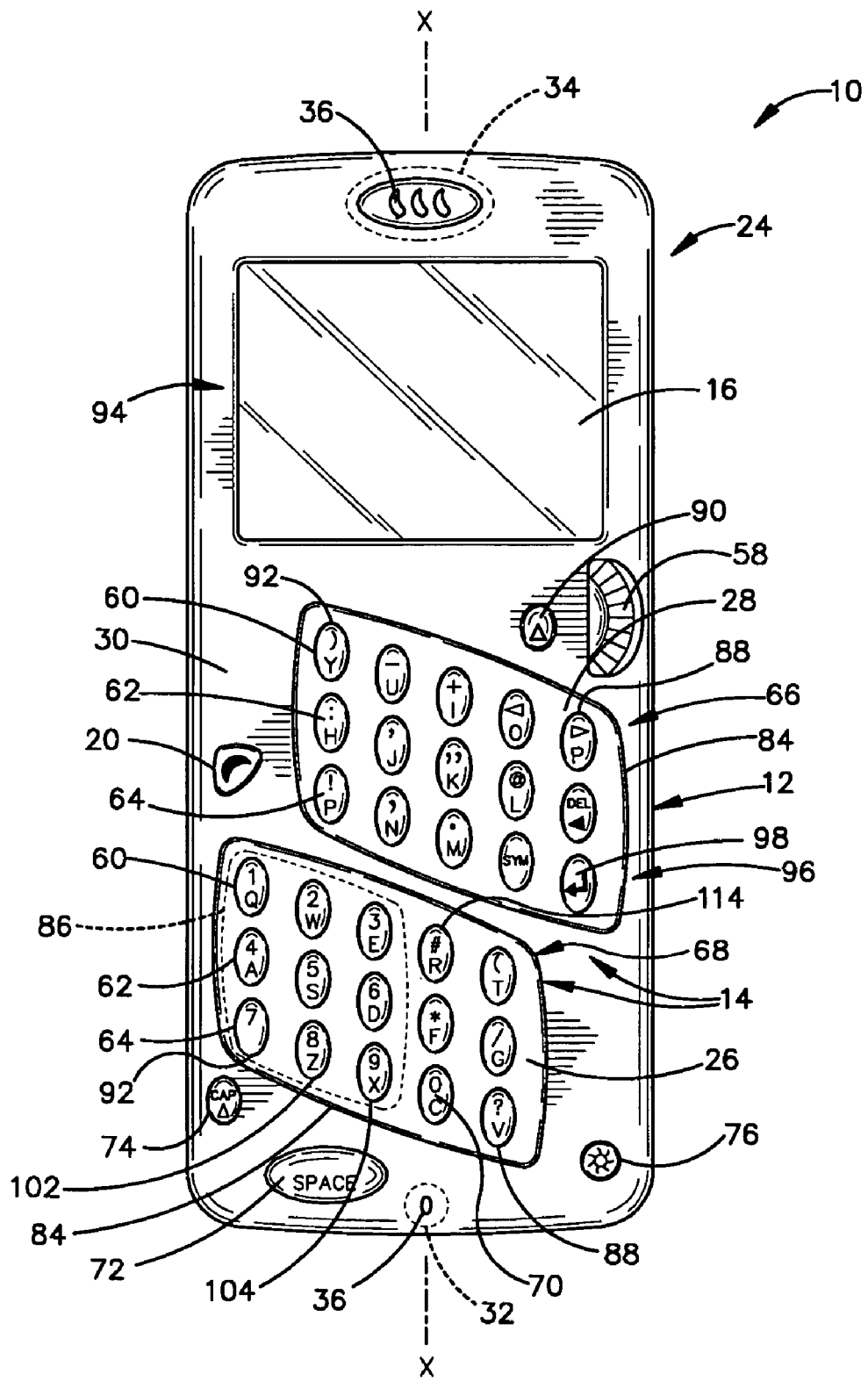
FIG. 9 is an elevated front view of a handheld mobile communication device having another example split keyboard.

FIGS. 7-9 depict a "candy-bar" type phone 24 that utilizes the example split keyboard 14. The candy-bar type phone 24 includes a housing 12 with the LCD display 16 and keyboard 14 positioned on a face 30 of the housing 12. The display 16 is positioned on the upper part 94 of the face 30 and the keyboard 14 is positioned on the lower part 96 of the face 30. The phone 24 includes a speaker 24 (shown in phantom) positioned inside the housing 12 beneath apertures 36 above the display 16, and a microphone 36 (shown in phantom) positioned inside the housing beneath aperture 36 on the lower part 96 of the face 30. A digital camera 38, battery 50, antenna 48, and auxiliary I/O devices may be associated with the phone 24, as known by those of skill in the art. In addition, advertising indicia 52, such as a logo, may be positioned on the housing 12, if desired.

As shown in FIGS. 7-9, the full size keyboard 14 is preferably positioned on the lower part 96 of the face 30 of the housing 12. Additional keys are also associated with the face 30. Other keys may alternatively be positioned on the side or back wall of the housing 12, if desired (not shown).

FIG. 7 depicts an example keyboard 14 where the left side section 26 is the upper section 66 and the right side section 28 is the lower section 68. The upper section is offset horizontally from the lower section 68, with the columns of the upper section 66 being offset to the left by about one column width. The upper and lower sections 66, 68 each include 5 columns and three rows. The columns of the upper and lower sections 66, 68 do not align, although they could, if desired. The rows and columns are straight and the keys are round. Alternatively, the rows could be curved or have other shapes, and the keys could be oval, or other shapes. The numbers "1-9" 86 are associated with keys in the lower section 68 and a space key 72 is centered on the housing 12 below the lower section 68 and is associated with the "0" key 70 such that the "0" is positioned directly beneath the remainder of the numbers "1-9" 86. The upper and lower sections 66, 68 are each independently delineated by a surface treatment 84, such as a raised or recessed surface or an engraved or embossed surrounding line.

The upper section includes keys associated with the following functions and symbols: ")", "−", "+", left shift, right shift, ":", "'"", """", "@", shift, ";", ".", "?", and "!". The shift function 20 is associated with the third row 64 of the first column 92. The lower section 68 includes keys associated with the following functions and symbols: "#", "(", "*", backspace/delete, and return/enter. The return/enter key 98 is associated with the third row 64 of the fifth column 88 of the lower section 68. The housing 12 also includes keys for talk 78, end 80, left arrow 82, right arrow 82, up arrow 82, down arrow 82, escape 56, power/backlight 76, and caps/caps lock 74. The caps/caps lock 74 and power/backlight 76 keys are positioned below the lower section 68 adjacent the space key 72. The talk 78, end 80, and arrow keys 82 are positioned above the upper section 66, and a thumb wheel 58 and escape key 56 are positioned directly to the right of the upper section 66.

FIG. 8 depicts a similar candy-bar type phone 24 that utilizes the example split keyboard 14. In this embodiment, the upper and lower sections 66, 68 are positioned directly above and below one another so that the columns of each section align with the other section. The right side section 28 is the upper section 66 and the left side section 26 is the lower section 68. Each section includes three rows and five columns. The numbers "1-9" 86 are associated with keys in the lower section 68 in the middle three columns, and a space bar/"0" key 72, 70 is positioned below the lower section 68 centered on the housing 12. In particular, the "0" 70 key is centered beneath the remainder of the numbers "1-9" 86 on the face 30 of the housing 12. This embodiment includes an additional send key 78, end key 80, escape key 56, thumb wheel 58, caps/caps lock key 74, and power/backlight key 76.

The thumb wheel 58 is positioned near the bottom of the face 30 adjacent the lower section 68, the power/backlight key 76, the caps/caps lock key 74, and the space bar 72. The escape key 56 is positioned adjacent the upper section 66. The send and end keys 78, 80 are positioned above the upper section 66, directly below the display 16.

The upper section includes keys associated with the following symbols and functions: ")", "−", "+", left shift, right shift, ":", "'", """, "@", backspace/delete, "!", ",", ".", sym, and return/enter. The return/enter key 98 is positioned in the third row 64, fifth column 88. The lower section 68 includes keys associated with the following symbols and function: "#", "(", "*", "/", shift, and "?". While a single caps/caps lock key 74 is shown as being associated with the lower section 68, an additional caps key 90 or caps/caps lock key 74 may also be associated with the upper section 66, such that upper and lower case numbers can be selected with either thumb of the user.

FIG. 9 depicts another embodiment of the candy-bar type phone 24, where a portion of the upper section 66 is positioned above a portion of the lower section 68 and a portion of the lower section 68 is positioned above a portion of the upper section 66. The right side section 28 is the upper section 66 and the left side section 26 is the lower section 68. Both the upper and lower sections 66, 68 include five columns and three rows. The left part of the upper section 66 is positioned at a higher vertical position on the face 30 of the housing 12 than the right part of the upper section. In addition, the left part of the lower section 68 is positioned at a higher vertical position on the face 30 of the housing 12 than the right part of the lower section 68. Alternatively, the upper and lower sections 66, 68 could be arranged in a reverse orientation (not shown), or the left side section 26 could be the upper section 66 and the right side section 28 could be the lower section 68.

The upper section 66 is shown offset from the lower section 68, so that the columns of the upper section 66 are offset to the right by about one column width. Other offset spacing may alternatively be utilized, if desired, or the columns of the upper and lower section 66, 68 could be aligned longitudinally on the face of the device. The numbers "0-9" 86 are associated with keys in the lower section 68, with the "1", "4", and "7" being positioned in the first column 92, the "2", "5", and "8" being associated with the second column 102, the "3", "6", and "9" being associated with the third column 104, and the "0" associated with the fourth column 114. In addition, the "#" and "*" are also associated with the fourth column 114 of the lower section 68. The lower section 68 also includes keys associated with "(", "/", and "?".

The upper section 66 includes keys associated with ")", "−", "+", left shift, right shift, ":", "'", """, "@", backspace/delete, "!", ",", ".", sym, and return/enter. The return/enter key 98 is associated with the fifth column 88, third row 64. Other keys are also associated with the face 30 of the housing 12, including a shift key 20, a caps key 90, a caps/caps lock key 74, a space key 72, a power/backlight key 76, and a thumb wheel 58. The shift key 20 is positioned above the lower section 68 adjacent the upper section 66. The caps key 90 is positioned directly above the upper section 66 adjacent the thumb wheel 58. The thumb wheel 58 is positioned below the display 16 above the upper section 66. The caps/caps lock key 74 and space bar 72 are positioned below the lower section 68, and the power/backlight key 76 is positioned below the upper section 66 adjacent the lower section 68. As is preferred, a caps key 90 is associated with both the lower and upper sections 66, 68 such that the user can select capital or lower case letters with each thumb during use.

Other key arrangements may also be utilized with the example keyboard 14, as long as the keyboard 14 is split into an upper section 66 and a lower section 68, where at least part of the upper section 66 is positioned above the lower section 68 and at least part of the lower section 68 is positioned beneath the upper section 66.

It is preferred that the keys be positioned at an orientation and in a particular shape that attempts to maximize the surface area of the thumb hitting the key and to provide the user with a comfortable position of the hands for data input. Also, the orientation should preferably encourage input by the thumbs, which the inventors of the present invention have discovered to be faster and more accurate in small hand-held electronic devices than touch-typing or "hunting and pecking" typing. An example of preferred key shapes and orientations is described in U.S. Pat. No. 6,278,442, file Jun. 29, 1998 and issued Aug. 21, 2001, and U.S. Design Patent No. D416,256, filed Jun. 26, 1998 and issued Nov. 9, 1999, the disclosures of which are hereby incorporated by reference in their entirety. In addition to hardware features that encourage optimal data entry through the use of thumbs, software features that are designed to minimize keystrokes and aid data entry may also be provided. An example of a mobile communication device having a keyboard assembly with hardware and software associated with key entry is described in U.S. patent application Ser. Nos. 09/967,537; 09/976,536; 10/302,242; and U.S. Pat. No. 6,278,442, the disclosures of which are incorporated herein by reference in their entirety.

The mobile communication device 10 may also include software, such as a predictive text computer program, that is used in conjunction with the keyboard 14. An example predictive text computer program is described in the following co-owned patent applications, which are incorporated herein by reference in their entirety: "Customizable Predictive Text Method For Reduced Keyboards," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keyboard", International Patent Application No. PCT/CA02/00862, filed Jun. 10, 2002. In a multi-tap methodology, the user taps a key multiple times until a desired letter, number, symbol, or function is selected. In the present case, a multi-tap method could be utilized to select among the multiple characters or functions associated with each key, rather than the shift function 20.

Another technology involves predictive text methodologies. These methodologies utilize database software to predict the entered text. One method involves automatically correcting common spelling mistakes (e.g., "teh" corrected to "the"). Predictive text methodologies use known spellings of words in combination with their probabilities and frequencies of use to determine a preferred word based upon input commands by a user. Disambiguation engines and predictive editor applications may be used to establish a single grammatical or semantic interpretation of the keystrokes entered by a user. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard 14 described herein, without limitation.

The handheld mobile communication devices 10, presented in FIGS. 4-9 include similar features, such as a housing 12, a keyboard 14 and an output device 16. The output device shown is a display 16, which is preferably a full graphic LCD.

Figure 10:
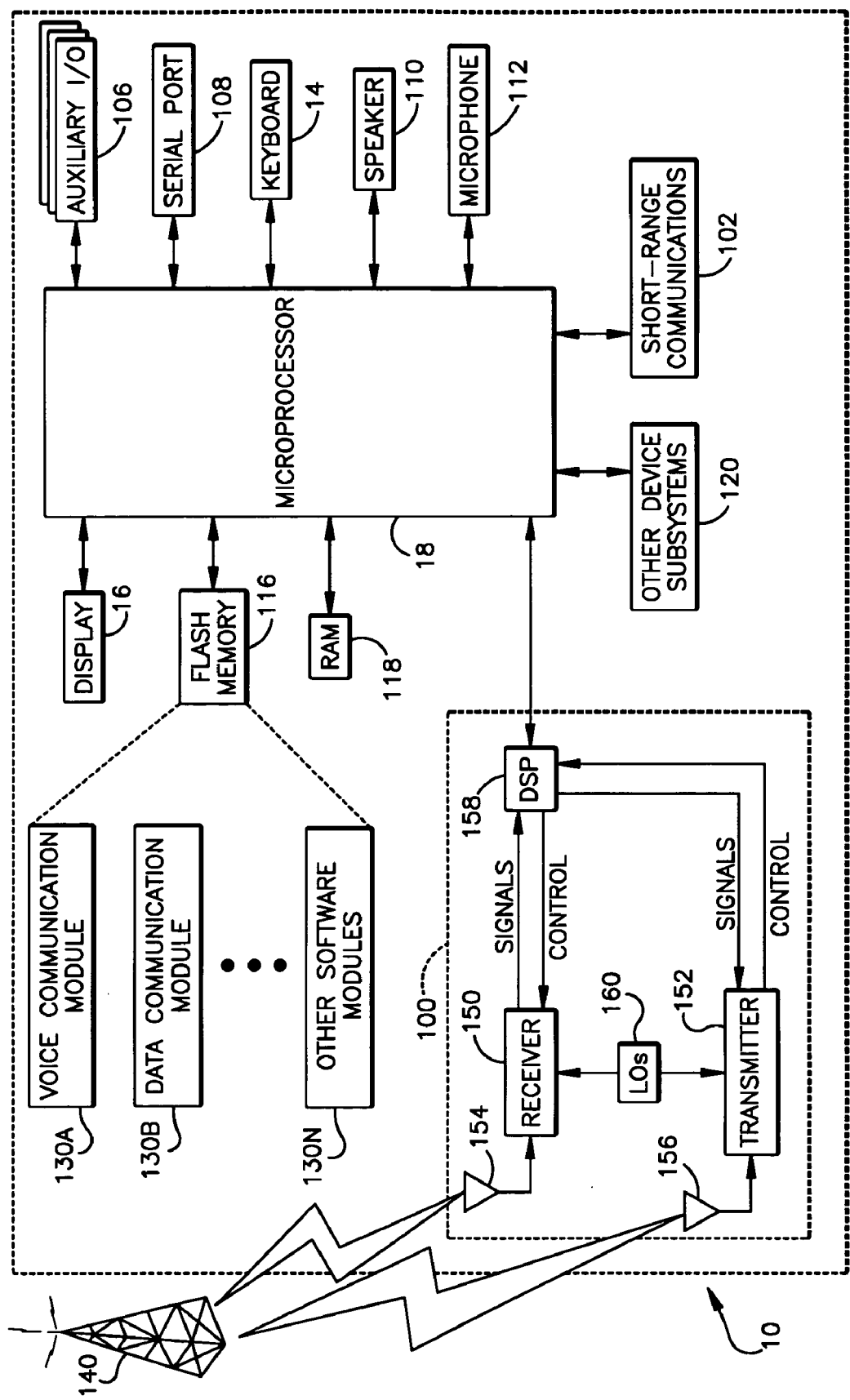
FIG. 10 is a block diagram illustrating an example mobile communication device system.

Other types of output devices may alternatively be utilized. A processing device 18, which is shown schematically in FIG. 10, is contained within the housing 12 and is coupled between the keyboard 14 and the display 16. The processing device 18 controls the operation of the display 16, as well as the overall operation of the mobile communication device 10, in response to actuation of keys on the keyboard 14 by the user.

The housing 12 may be elongated vertically, or may take on other sizes and shapes. The keyboard may include a mode selection key, or other hardware or software for switching between text entry and telephony entry.

In addition to the processing device 18, other parts of the mobile communication device 10 are shown schematically in FIG. 10. These include a communications subsystem 100; a short-range communications subsystem; the keyboard 14 and the display 16, along with other input/output devices 106, 108, 110 and 112; as well as memory devices 116, 118 and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

While all of the examples depict a QWERTY arrangement of alphabetic characters, the examples are equally applicable to other standard arrangements, including, without limitation, QWERTZ, AZERTY, and DVORAK.

Figure 3:
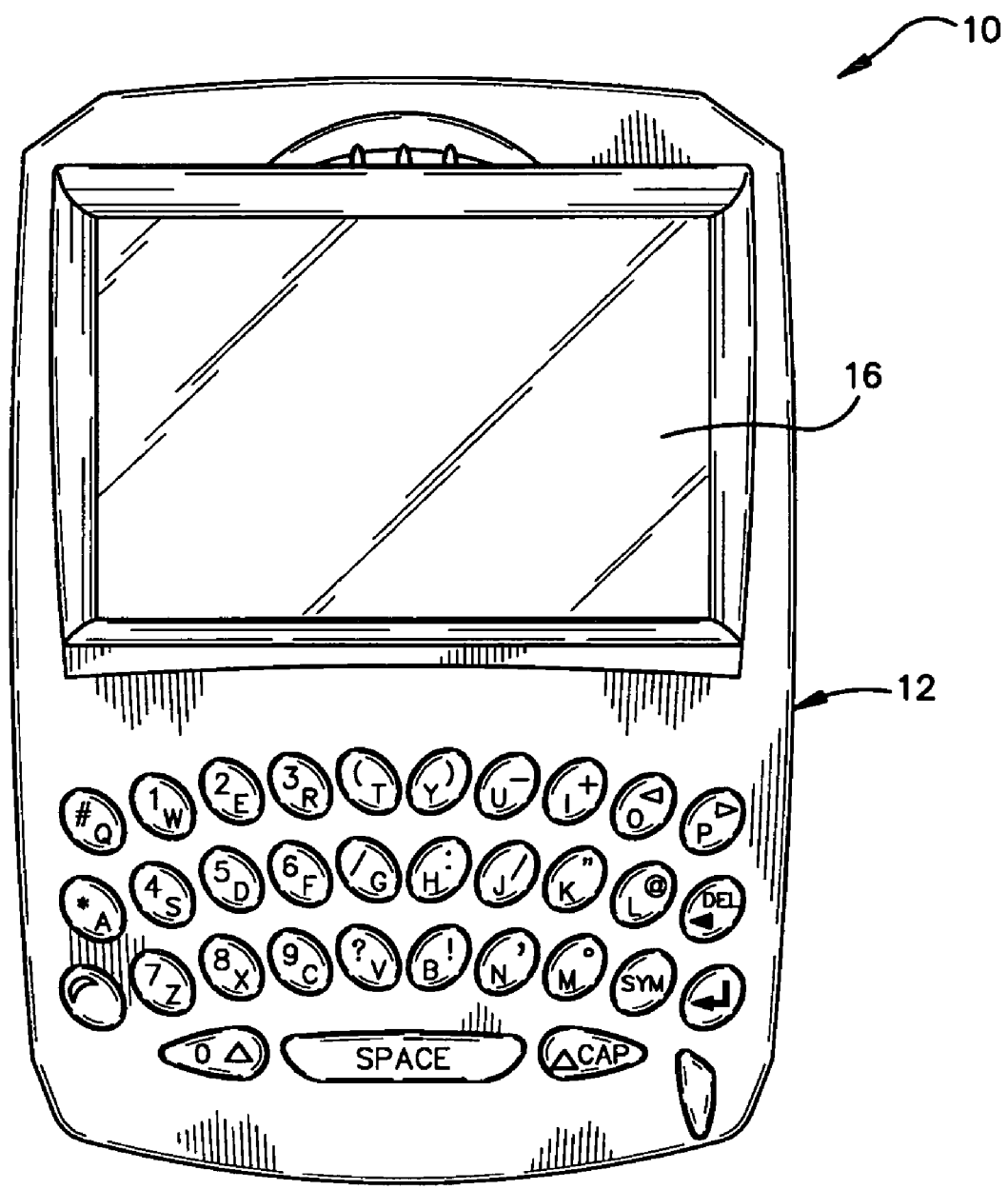
FIG. 3 is an elevated view of a prior art handheld mobile communication device.

The keys may be toggle keys or non-toggle keys, if desired. Additional or fewer rows and columns, above and beyond the number shown herein, may also be provided to position functional and other keys, if desired. Furthermore, the keys may be aligned in columns, or may be staggered, in some embodiments. Rows and/or columns may be straight, curved, or otherwise. For example, in a preferred embodiment, rows may be arcuate, similar to that shown in the prior art keyboards of FIGS. 2 and 3. In addition, while round and oval keys are shown, other shaped keys may be utilized. In a preferred embodiment, the keys are oval shaped and positioned at an angle relative to the longitudinal axis X-X of the mobile communication device 10.

The word "substantially" if present is used herein as an estimation term.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A keyboard comprising:
a plurality of keys associated with alphanumeric characters including the letters A-Z and at least the numbers 1-9, said keys being split into a left side section and a right side section, with the left side section being grouped as a contiguous block of keys having a top row and a bottom row, and the right side section being grouped as a contiguous block of keys having a top row and a bottom row,
the left side section is oriented at least partially above the right side section to define an upper section corresponding to the left side section and a lower section corresponding to the right side section, with the left side section being positioned above the right side section such that at least part of the bottom row of the left side section is positioned above at least part of the top row of the right side section,
or the right side section is oriented at least partially above the left side section to define an upper section corresponding to the right side section and a lower section corresponding to the left side section, with the right side section being positioned above the left side section such that at least part of the bottom row of the right side section is positioned above at least part of the top row of the left side section,
wherein the alphanumeric characters represent a QWERTY-style key arrangement, and when the left side section is oriented at least partially above the right side section, the upper section includes said keys associated with the alphabetic characters "QWERTASDFGZXCV", and the lower section includes said keys associated with the alphabetic characters "YUIOPHJKLBNM", or when the right side section is oriented at least partially above the left side section, the upper section includes said keys associated with the alphabetic characters "YUIOPHJKLBNM", and the lower section includes said keys associated with the alphabetic characters "QWERTASDFGZXCV".

2. The keyboard of claim 1, wherein all of the keys of the upper section are positioned above all of the keys of the lower section.

3. The keyboard of claim 1, wherein part of the upper section transversely overlaps part of the lower section.

4. The keyboard of claim 1, wherein the upper section comprises at least three rows and five columns of keys, and the lower section comprises at least three rows and five columns of keys.

5. The keyboard of claim 4, wherein the five columns of the upper section align longitudinally with the five columns of the lower section.

6. The keyboard of claim 4, wherein the five columns of the upper section are offset longitudinally from the five columns of the lower section.

7. The keyboard of claim 4, wherein the left side section of keys comprises a first row associated with characters "Q", "W", "E", "R", and "T", a second row associated with characters "A", "S", "D", "F", and "G", and a third row associated with characters "Z", "X", "C", and "V"; and
the right side section comprises a first row associated with characters "Y", "U", "I", "O", and "P", a second row associated with characters "H", "J", "K", and "L", and a third row associated with characters "B", "N", and "M".

8. The keyboard of claim 7, wherein the left side section of keys is associated with numbers 1-9, with the "1", "2", and "3" being associated with the first row, the "4", "5", and "6" being associated with the second row, and the "7", "8", and "9" being associated with the third row.

9. The keyboard of claim 8, further comprising a key associated with the space function and a key associated with the number "0".

10. The keyboard of claim 9, wherein the space function and the number "0" are associated with the same key.

11. The keyboard of claim 7, wherein the right side section of keys is associated with numbers 1-9, with the "1", "2", and "3" being associated with the first row, the "4", "5", and "6" being associated with the second row, and the "7", "8", and "9" being associated with the third row.

12. The keyboard of claim 11, further comprising a key associated with the space function and a key associated with the number "0".

13. The keyboard of claim 7, wherein the number "0" is associated with a key in one of the left side section or the right side section.

14. A mobile communication device comprising:
a housing having a face; and
the keyboard of claim 7 associated with the face of the housing.

15. The keyboard of claim 1, wherein at least some of the plurality of keys are further associated with at least one of symbols or functions.

16. The keyboard of claim 1, further comprising a thumb wheel coupled to the keyboard.

17. The keyboard of claim 1, further comprising a key associated with a "send" function, a key associated with an "end" function, and at least one key associated with a "shift" function.

18. The keyboard of claim 1, further comprising at least one key associated with the caps function.

19. The keyboard of claim 18, wherein the at least one key associated with the caps function comprises a first caps key and a second caps key, with the first caps key being associated with the upper section and the second caps key being associated with the lower section.

20. A mobile communication device comprising:
a housing having a face; and
the keyboard of claim 1 associated with the face of the housing.

* * * * *